(12) United States Patent
Choi et al.

(10) Patent No.: US 10,101,858 B2
(45) Date of Patent: Oct. 16, 2018

(54) TOUCH SCREEN PANEL AND MANUFACTURING METHOD THEREOF

(71) Applicant: Samsung Display Co., Ltd., Yongin-si (KR)

(72) Inventors: Jong Hyun Choi, Seoul (KR); Jung-Moo Hong, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 31 days.

(21) Appl. No.: 14/854,934

(22) Filed: Sep. 15, 2015

(65) Prior Publication Data

US 2016/0299608 A1 Oct. 13, 2016

(30) Foreign Application Priority Data

Apr. 13, 2015 (KR) ........................ 10-2015-0051692

(51) Int. Cl.
*G06F 3/047* (2006.01)
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04102* (2013.01); *G06F 2203/04103* (2013.01); *G06F 2203/04112* (2013.01)

(58) Field of Classification Search
CPC .............. G06F 3/044; G06F 3/0416; G06F 2203/04102; G06F 2203/04103; G06F 2203/04112
USPC ......................................................... 345/173
See application file for complete search history.

(56) References Cited

U.S. PATENT DOCUMENTS

| 8,466,366 | B2 * | 6/2013 | Srinivas | ................... | H01B 1/02 |
|||||| 174/126.1 |
| 2006/0097991 | A1 * | 5/2006 | Hotelling | .............. | G06F 3/0416 |
|||||| 345/173 |
| 2007/0065651 | A1 * | 3/2007 | Glatkowski | ............ | B82Y 30/00 |
|||||| 428/297.4 |

(Continued)

FOREIGN PATENT DOCUMENTS

| KR | 10-2013-0048717 | 5/2013 |
| KR | 10-2013-0074933 | 7/2013 |

(Continued)

OTHER PUBLICATIONS

Sukanta De, et al., ", Silver Nanowire Networks as Flexible, Transparent, Conducting Films: Extremely High DC to Optical Conductivity Ratios", ACNANO, 2009, pp. 1767-1774, vol. 3, No. 7.

*Primary Examiner* — Benyam Ketema
(74) *Attorney, Agent, or Firm* — H.C. Park & Associates, PLC

(57) ABSTRACT

An exemplary embodiment discloses a touch screen panel including a substrate, touch electrodes positioned in a touch area of the substrate and configured to sense a touch, connecting wirings connected to the touch electrodes, and pads positioned in a peripheral area of the substrate and connected to the electrodes. The touch electrodes include a first electrode and a second electrode positioned on the first electrode. The first electrode includes openings and the second electrode covers the first electrode and the openings of the first electrode.

12 Claims, 10 Drawing Sheets

(56) References Cited

U.S. PATENT DOCUMENTS

| | | | | |
|---|---|---|---|---|
| 2007/0298253 | A1* | 12/2007 | Hata | B82Y 10/00 428/339 |
| 2008/0259262 | A1* | 10/2008 | Jones | B82Y 10/00 349/139 |
| 2009/0167703 | A1* | 7/2009 | You | G02F 1/13338 345/173 |
| 2009/0310218 | A1* | 12/2009 | Hane | C08J 7/047 359/485.01 |
| 2010/0156827 | A1* | 6/2010 | Joo | G02F 1/13338 345/173 |
| 2011/0199324 | A1* | 8/2011 | Wang | G06F 3/0412 345/173 |
| 2012/0044160 | A1* | 2/2012 | Lan | G06F 3/044 345/173 |
| 2014/0139481 | A1* | 5/2014 | Han | G06F 3/044 345/174 |
| 2015/0116073 | A1* | 4/2015 | Suzuki | H03K 17/9647 338/47 |
| 2015/0130726 | A1* | 5/2015 | Min | G06F 3/0412 345/173 |
| 2016/0041646 | A1* | 2/2016 | Cho | G06F 3/044 345/174 |

FOREIGN PATENT DOCUMENTS

| | | |
|---|---|---|
| KR | 10-2014-0003217 | 1/2014 |
| KR | 10-2014-0016070 | 2/2014 |
| KR | 10-2014-0029323 | 3/2014 |
| KR | 10-2015-0060049 | 6/2015 |

* cited by examiner

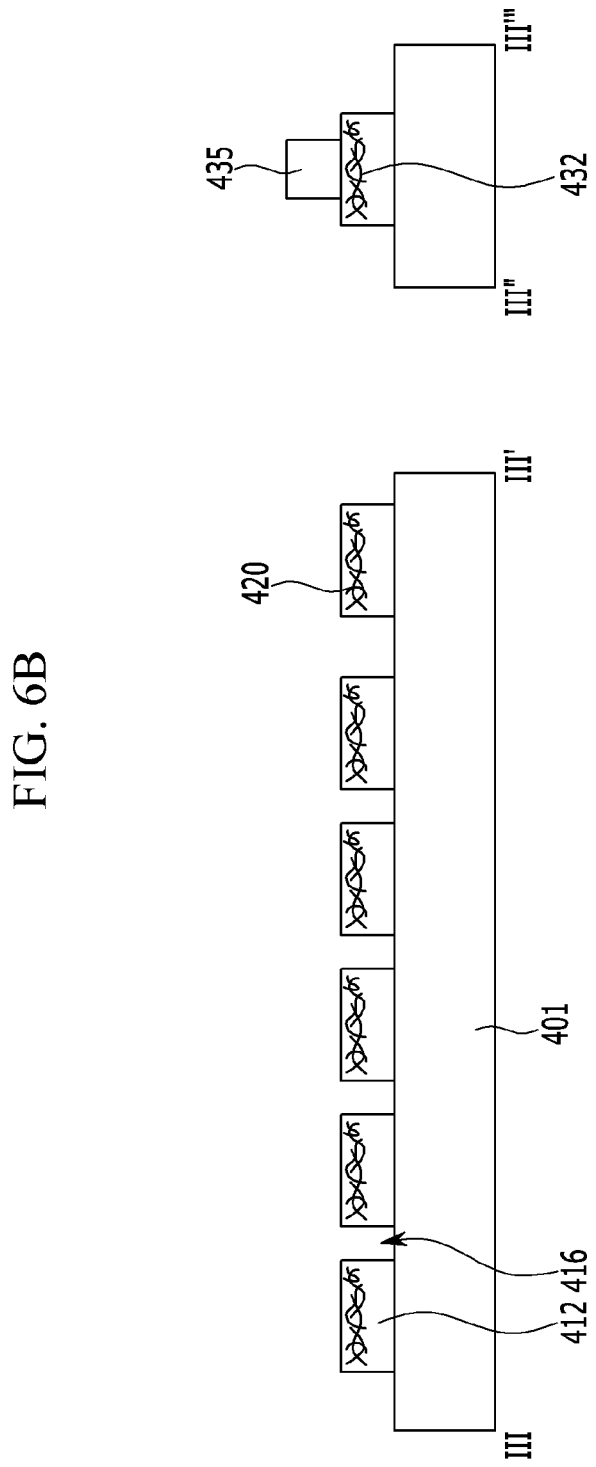

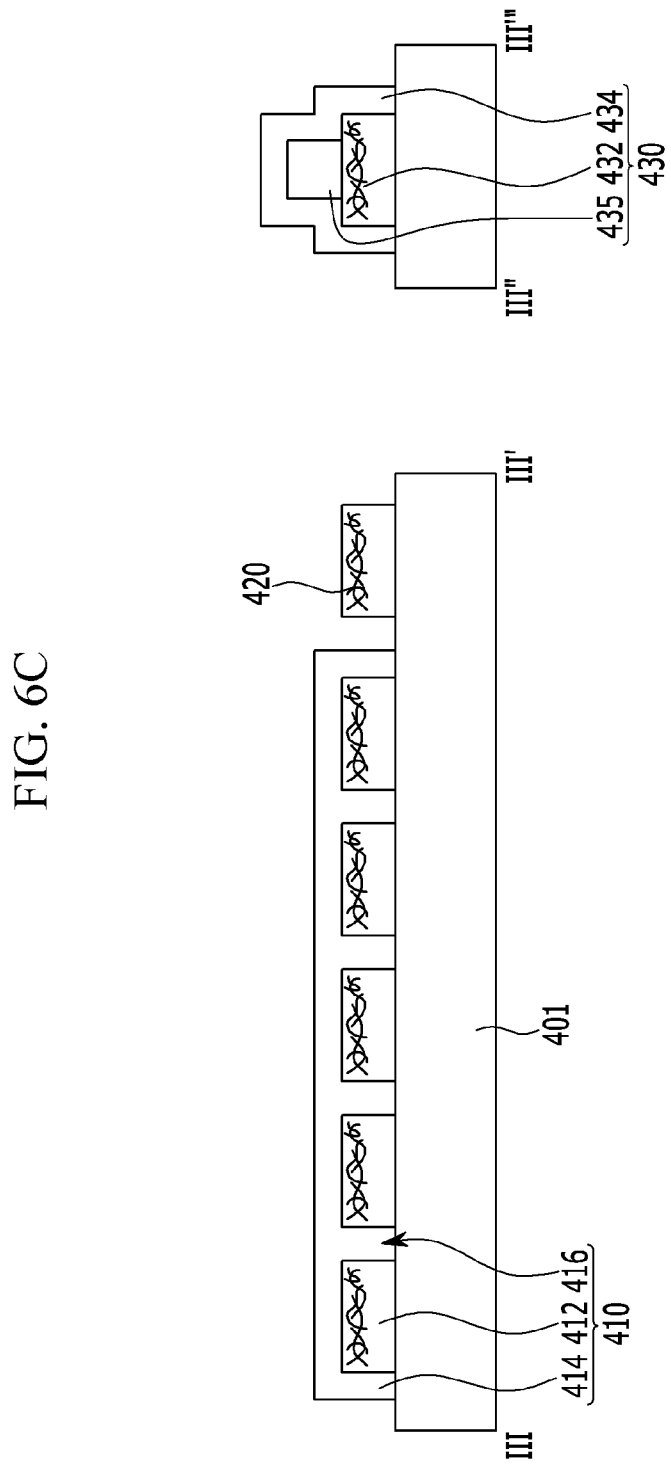

TOUCH SCREEN PANEL AND MANUFACTURING METHOD THEREOF

CROSS-REFERENCE TO RELATED APPLICATION

This application claims priority from and the benefit of Korean Patent Application No. 10-2015-0051692, filed on Apr. 13, 2015, which is hereby incorporated by reference for all purposes as if fully set forth herein.

BACKGROUND

Field

Exemplary embodiments relate to a touch screen panel and a manufacturing method thereof.

Discussion of the Background

A user may interact with a touch sensing function of a liquid crystal display (LCD), an organic light emitting diode display (OLED display), and an electrophoretic display. The touch sensing function of the display devices senses a change (i.e., a change in pressure, change in charge, change in light) applied to a screen of the display device when a user causes an object (i.e., a finger, a touch pen, etc.) to approach or contact a touch surface. Thus, the touch sensing function determines whether an object approaches or contacts the touch surface and determines contact information based on the contact positions of the approaching or touching object.

The touch sensing functions of several electronic devices may be implemented by a touch sensor. The touch sensor may be a resistive type, a capacitive type, an electromagnetic type (EM), and an optical type.

A capacitive type touch sensor may include a sensing capacitor formed of sensing electrodes capable of transferring a sensing signal. The sensing capacitor may sense a change in capacitance or a charged state of charge of the sensing capacitor generated when a conductor (i.e., a finger or a touch pen) approaches the touch sensor. Thus, the capacitive type touch sensor may determine whether the touch panel of the electronic device was touched. If the capacitive type touch sensor determines that the touch panel of the electronic device has been touched, then the capacitive type touch sensor may also determine the touch position of the object. The capacitive type touch sensor may include touch electrodes that are disposed in a touch sensing region capable of sensing a touch. The touch wiring may transfer a sensing input signal to the touch electrode or transfer a sensing output signal of the touch electrode that is generated depending on a touch to a touch driver.

The touch sensor may be embedded in the display device (in-cell type), directly formed on an outer surface of the display device (on-cell type), or a separate touch sensor unit to the display device (add-on cell type). It is common to use an add-on cell type touch sensor for a flexible display device. A common method for implementing the add-on touch sensor for the flexible display device includes forming a separate touch screen panel in a film or plate form in which the touch sensor is formed and then attaching the touch screen panel on a display panel (add-on cell type).

However, the flexible electronic device needs to have a flexible touch screen to prevent the occurrence of defects.

Touch electrode materials having flexible characteristics include, for example, metal nano wire (i.e., silver nano wire (AgNW)), carbon nanotube (CNT), graphene, metal mesh, and conductive polymer. However, when silver nano wire (AgNW) is used in the touch electrode, the pattern of the silver nano wire (AgNW) may be visible.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch screen panel and a manufacturing method thereof having advantages of decreasing visibility of a pattern of a touch electrode and power consumption at the time of driving.

Additional aspects will be set forth in the detailed description which follows, and, in part, will be apparent from the disclosure, or may be learned by practice of the inventive concept.

An exemplary embodiment discloses a touch screen panel including a substrate, touch electrodes positioned in a touch area of the substrate and configured to sense a touch, connecting wirings connected to the touch electrodes, and pads positioned in a peripheral area of the substrate and connected to the electrodes. The touch electrodes include a first electrode and a second electrode positioned on the first electrode. The first electrode includes openings and the second electrode covers the first electrode and the openings of the first electrode.

An exemplary embodiment also discloses a method of manufacturing a touch screen panel, the method steps including disposing a first electrode, a first wiring, and a first conductive layer on a substrate in a pattern, disposing a second electrode covering the first electrode, and disposing a second conductive layer on the first conductive layer.

In addition to the above-mentioned technical problems of the present invention, other features and advantages of the present invention will be described below or will be clearly understood to those skilled in the art from the technology and description.

According to the touch screen panel and the manufacturing method thereof in accordance with an exemplary embodiment of the present invention, it is possible to decrease the visibility of the pattern of the touch screen and the power consumption at the time of the driving.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIGS. 6A, 6B, and 6C are partial cross-sectional views of a manufacturing process of a touch sensor according to another exemplary embodiment

DETAILED DESCRIPTION OF THE ILLUSTRATED EMBODIMENTS

Figure 1:
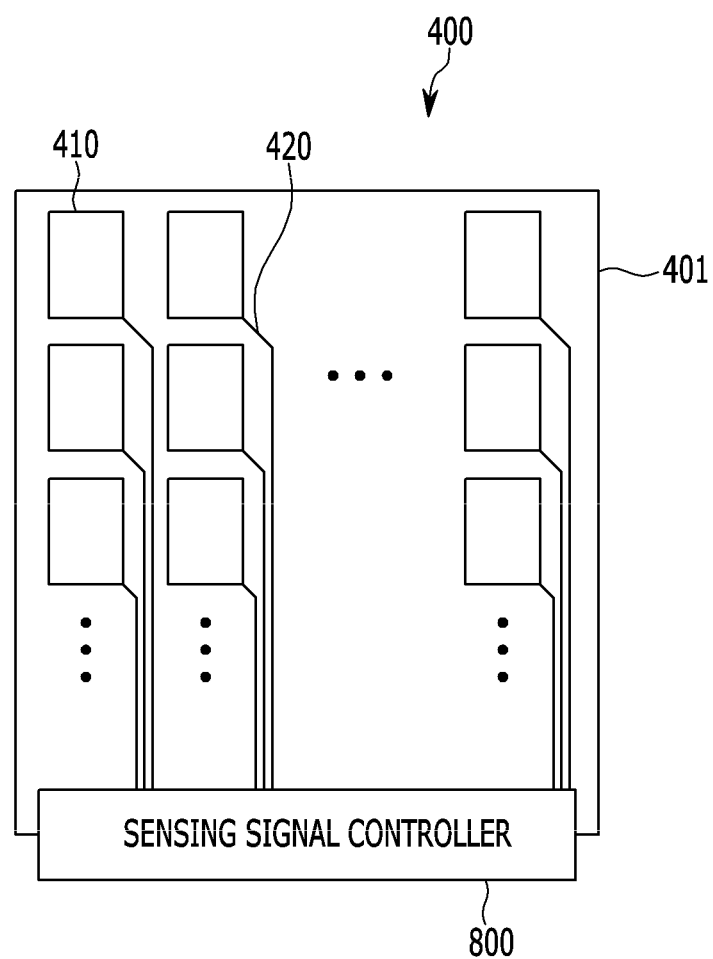
FIG. 1 is a schematic plan view of a touch panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a schematic plan view of a touch panel according to an exemplary embodiment.

As illustrated in FIG. 1, a touch panel 400 according to an exemplary embodiment includes a touch sensor formed on a substrate 401 and a sensing signal controller 800 connected to the touch sensor.

The touch sensor according to the exemplary embodiment is a capacitive-type touch sensor which may sense a touch of an external object. However, the exemplary embodiments are not limited to a capacitive-type touch sensor and may instead include different types of touch sensors.

The touch sensor may be included in a display panel or a separate touch panel to sense a touch. The present exemplary embodiment will describe the touch sensor as included in the touch panel 400. Here, the touch may include a case in which external objects directly contact the display panel or the touch panel 400 and a case in which external objects approach the display panel or the touch panel 400.

The touch sensor according to the exemplary embodiment includes touch electrodes 410 that are positioned in an active area and wirings 420 that are connected to the touch electrodes 410.

Here, the active area is an area in which a touch may be applied and a touch may be sensed. For example, in the case of the display panel, the active area may overlap the display area that may display an image.

In the case of the touch panel 400, the active area may be a touch area. When the touch panel 400 is embedded in the display panel, the touch area may overlap the display area. Hereinafter, the active area is also called the touch area.

The touch electrodes 410 may be arranged in a matrix form and when being viewed in a cross section structure, may be formed on the same layer.

Further, the touch electrode 410 may include transparent conductive materials such as indium tin oxide (ITO), indium zinc oxide (IZO), and metal nano wire, but is not limited to such materials. The metal nano wire may be a silver nano wire (AgNW).

Further, as illustrated in FIG. 1, a shape of the touch electrode 410 may be a quadrangle but is not limited a quadrangle shape. Therefore the touch electrode may have various shapes.

To increase touch sensitivity, the touch electrode 410 may include a plurality of protrusions and depressions (not illustrated) which are formed at an edge. When the edge of the touch electrode 410 includes the plurality of protrusions and depressions, edges having the protrusions and depressions of adjacent touch electrodes may be engaged with each other.

A length of one side of the touch electrode may be approximately several mm. For example, approximately 10 mm or less. In another example, a length of one side of the touch electrode is approximately 4 mm to 5 mm. However, a size of the touch electrode 410 may be appropriately controlled depending on touch sensing resolution.

The touch electrodes 410 are separated from each other within a touch area and different touch electrodes 410 may be connected to a sensing signal controller 800 through different connecting wirings 420.

The touch electrodes 410 may each receive sensing input signals from a sensing signal controller 800 through the connecting wirings 420, generate sensing output signals depending on a touch, and transmit the generated sensing output signals to the sensing signal controller 800.

Further, each touch electrode 410 may form a self-sensing capacitor to receive the sensing input signal and be then charged with a predetermined state of charge.

Next, when the touch electrode 410 is touched by external objects (i.e., a finger), the charged state of charge of the self-sensing capacitor is changed. Thus, the sensing output signal is different from the sensing input signal and the touch electrode 410 may output the different sensing output signal. The touch electrode 410 may determine touch information (i.e., whether an object touched the touch panel or not as well as touched positions) based on the generated sensing output signal.

Further, the connecting wiring 420 connects between a touch electrode $S_X$ and the sensing signal controller 800 to transfer the sensing input signal or the sensing output signal. The connecting wiring 420 may be positioned on the same layer as the touch electrode 410 and may be made of the same material as the touch electrode 410. However, the exemplary embodiment is not so limited. Therefore the connecting wiring 420 may be positioned on different layers from the touch electrode 410 and may also be connected to the touch electrode 410 through a separate connecting part.

According to the exemplary embodiment illustrated in FIG. 1, touch electrodes 410 closer to the sensing signal controller 800 have more connecting wirings 420 disposed between columns of adjacent touch electrodes 410 than touch electrodes 410 further from the sensing signal controller 800. Therefore, the size of the touch electrode 410 is reduced toward the sensing signal controller 800.

The connecting wiring 420 may have a width from about 10 μm to about 100 μm. However, the connecting wire 420 is not limited to such a width.

Therefore, a connecting portion between the touch electrode 410 and the connecting wiring 420 forms a bottle neck portion having suddenly increased or reduced width.

The sensing signal controller 800 is connected to the touch electrode 410 of the touch panel 400 to transfer the sensing input signal to the touch electrode 410 and receive the sensing output signal. The sensing signal controller 800 processes the sensing output signal to generate touch information (i.e., whether an objected touched the touch panel 400 or not as well as the position the object touched the touch panel 400).

Further, the sensing signal controller 800 may be positioned on a printed circuit board (PCB) separate from the touch panel 400. The sensing signal controller 800 may be attached on the touch panel 400 in an IP chip form or a TCP form. Alternatively, the sensing signal controller 800 may be integrated on the touch panel 400.

Hereinafter, an inter-layer configuration of the touch sensor according to the exemplary embodiment will be described in more detail.

Figure 2:
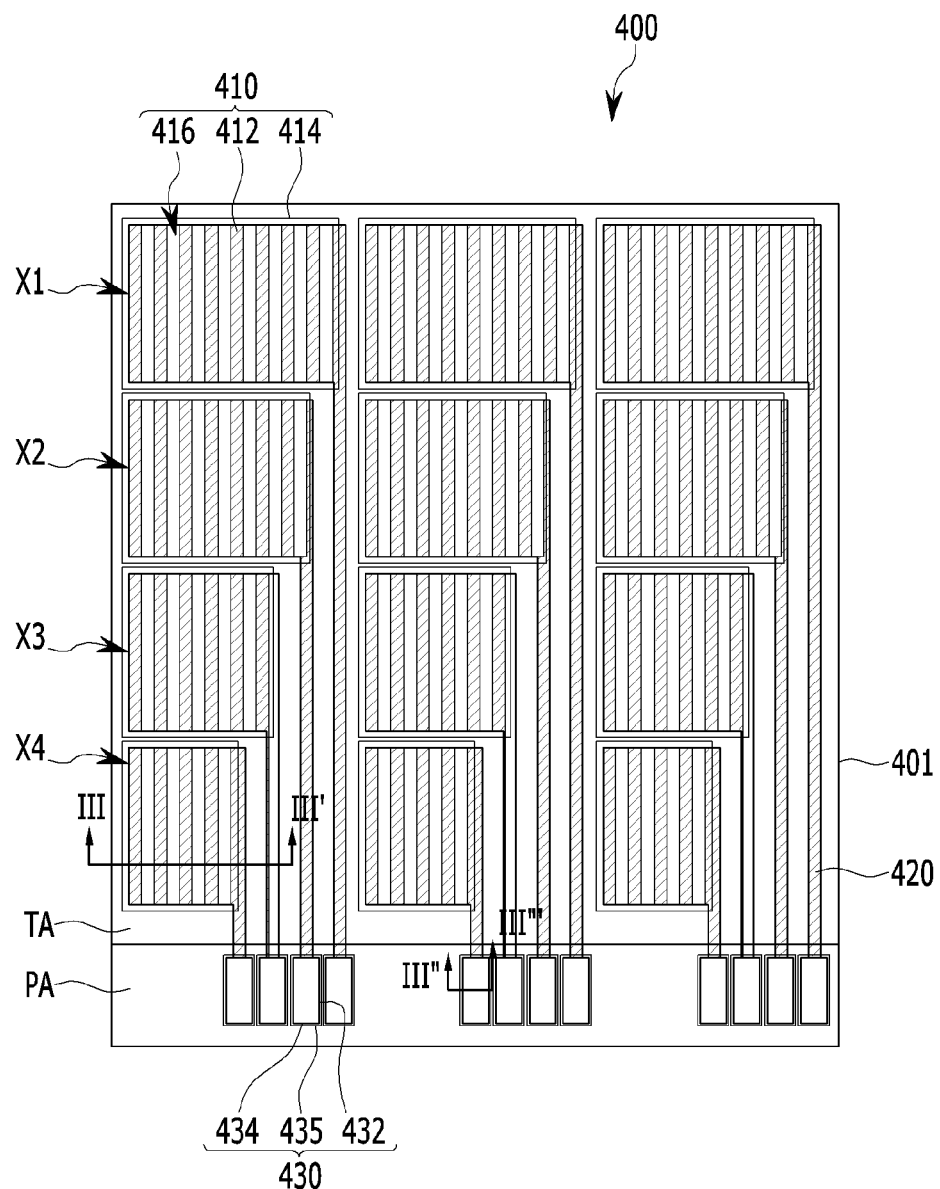
FIG. 2 is a layout view of the touch sensor according to the exemplary embodiment illustrated in FIG. 1.
Figure 3:
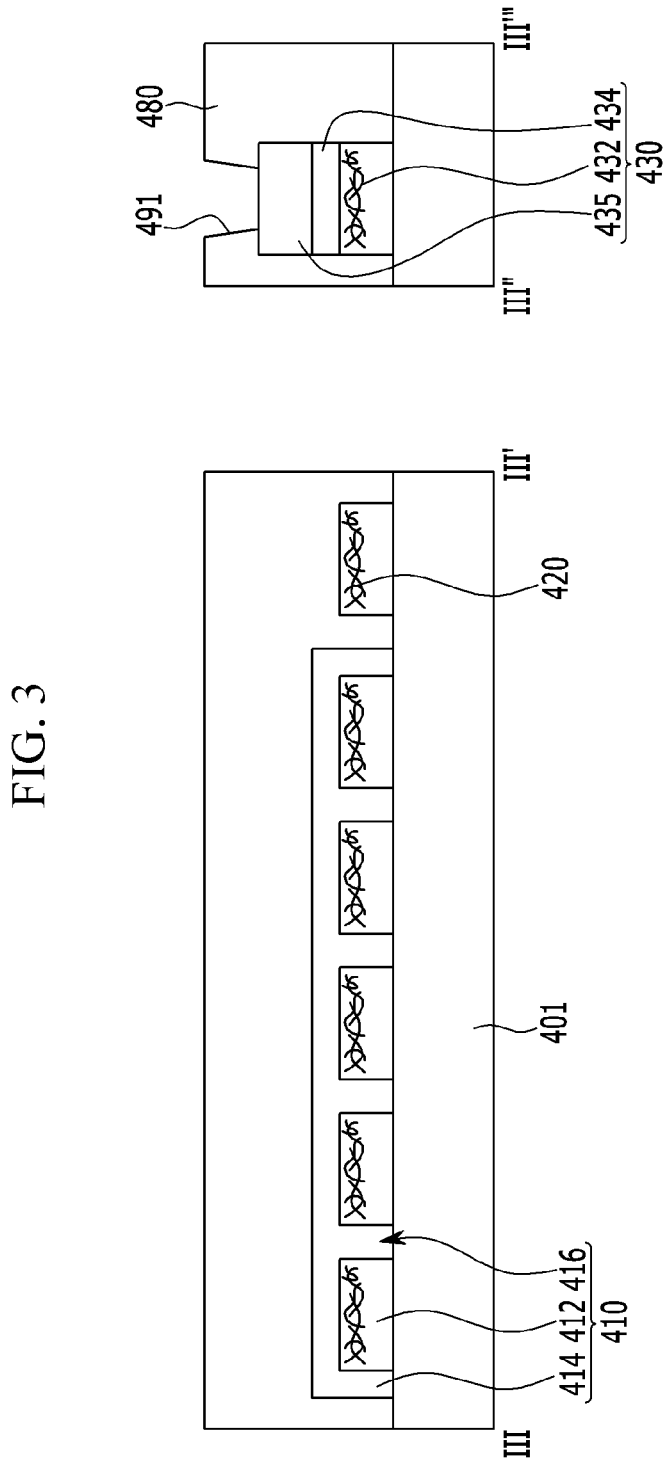
FIG. 3 is cross-sectional view taken along the sectional lines III-III' and III"-III'" of FIG. 2.

FIG. 2 is a layout view of the touch sensor according to the exemplary embodiment illustrated in FIG. 1. FIG. 3 is cross-sectional view taken along the cross-sectional lines III-III' and III"-III"' of FIG. 2.

As illustrated in FIG. 2, the touch panel 400 according to exemplary embodiment includes the substrate 401 and touch electrodes 410 formed on the substrate 401.

The touch electrodes 410 are disposed in one direction at a predetermined interval. Each touch electrode 410 may be connected to pads 430 through the connecting wiring 420.

The connecting wiring 420 may input the input signal to the touch electrode 410 or may output the output signal to the sensing signal controller 800 through the pad 430.

Most of the connecting wirings 420 are positioned within a touch area TA. The touch electrodes 410 are formed in the touch area TA and are each connected to the pads 430 that are positioned in a peripheral area PA out of the touch area TA. More specifically, the connecting wiring 420 is connected to one side of the touch electrode 410 facing the pad 430 and is positioned between the two adjacent touch electrodes 410.

In the above-mentioned structure, the connecting wiring 420 is positioned between the touch electrodes 410. Thus, the width of the peripheral area PA in which the pad 430 is not formed may be reduced.

Touch electrodes 410 closer to the pad 430 may have a smaller area than touch electrodes 410 further away from the pad 430. A first touch electrode 410 positioned further from a second touch electrode 410 may have a larger area than the second touch electrode 410. The second touch electrode may have a width that is reduce by an amount corresponding to the width of a connecting wiring 420 is straightly connected to the pad 430 without being bent. The connecting wiring 420 may be connected to one side of the first touch electrode 410.

The area of the touch electrode 410 of a first row X1 (i.e., furthest away from the pad 430) is the largest and the widest among the touch electrodes in the touch panel 400. The area of the touch electrode 410 of a fourth row X4 (i.e., closest to the pad 430) is smallest and most narrow. The size difference between the touch electrodes 410 of the first row X1 and the second row X4 is caused by all the connecting wirings 420 connected to the touch electrodes 410 of the first row X1, the second row X2, and the third row X3 pass between the touch electrodes 410 positioned in the fourth row X4. FIG. 1 illustrates three columns and four rows, but the exemplary embodiments are not limited to such an arrangement. Therefore, if necessary, a matrix larger than that may be formed.

The touch electrode 410 according to the exemplary embodiment receives the sensing input signal through the connecting wiring 420 and is then charged with a predetermined state of charge. Next, when the touch electrode 410 is touched by external objects (i.e., a finger), the charged state of charge of the self-sensing capacitor is changed. Thus, the sensing output signal is different from the sensing input signal and the sensing output signal may be output by the touch electrode 410. It is possible to find out the touch information (i.e., whether an object touched the touch panel 400 or not as well as the touched position) based on the change in the sensing output signal.

Referring to FIG. 3, the substrate 401 of the touch panel 400 according to the exemplary embodiment may include plastic such as polycarbonate, polyimide, and polyether sulfone or glass.

The substrate 401 may be a transparent flexible substrate 401 having flexibility (i.e., elasticity or the like) and may be folded, bent, rolled, or stretched in at least one direction.

The touch electrodes 410 and the pads 430 (not shown in FIG. 3), each connected to the touch electrodes 410 by the connecting wirings 420, are formed on the substrate 401.

The touch electrode 410 may include a first electrode 412 and a second electrode 414 covering a first electrode 412.

The first electrode 412 may be made of the metal nano wire. In this case, the metal nano wire may include a metal wire of silver (Ag), copper (Cu), and the like. The metal nano wires may be connected to each other in a mesh form to form a conductive electrode.

Further, the metal nano wire may be formed by slit coating, inkjet printing, or a solution process such as spray.

The first electrode 412 may protect the metal nano wire and may further include polymer resin which may fix the metal nano wire. Here, the polymer resin may include acrylate-based organic materials such as acryl polyester resin.

The polymer resin may be applied while being mixed together with the metal nano wire. Alternately, after a metal nano wire layer is formed, the polymer resin may be applied thereon.

The polymer resin fills a space between the metal nano wires and may increase adhesion between the metal nano wire and the substrate 401.

The metal nano wires have characteristics of scattering incident light. Therefore the phenomenon that the electrode including the metal nano wire looks blurry is caused leading to reduce the visibility of the touch panel 400. To improve the visibility of the touch panel 400, the first electrode 412 of the touch electrode 410 according to the exemplary embodiment includes openings 416 and forms a pattern of the first electrode 412. In this case, the first electrode 412 includes openings 416. A portion in which the first electrode 412 other than the openings 416 is formed is called the pattern of the first electrode 412.

The first electrode 412 has high transmittance and a sheet resistance characteristic of a predetermined reference or less. Therefore, the first electrode 412 may have high conductivity.

Further, the first electrode 412 may be more flexible than other metal thin films.

The second electrode 414 may cover the first electrode 412 including the openings 416. The second electrode 414 may be positioned on the substrate 401.

Compared with the case that the second electrode 414 has the same pattern form as the first electrode 412, the second electrode 414 according to the exemplary embodiment is formed to completely cover the first electrode 412 including the openings 416 to expand the area of the second electrode 414. Thus, the power consumption at the time of the driving is improved in touch panel 400.

More specifically, the second electrode 414 according to a Comparative Example has the same form as the first electrode 412. Therefore, the second electrode 414 of the Comparative Example has a reduced area that corresponds to the openings 416. The second electrode 414 according to the exemplary embodiment completely covers the first electrode 412, including the openings 416. Therefore the second electrode 414 according to the exemplary embodiment may have the expanded area improving power consumption at the time of the driving.

In this case, the second electrode 414 may have the transmittance of a predetermined reference or more to improve the transmittance and the pattern visibility. The second electrode 414 may be made of the transparent conductive material that may be dry-etched and may be formed to have a thickness of 300 Å or less. For example, the second electrode 414 may be indium tin oxide (ITO) and may have the transmittance of about 85% or more in a visible light region.

Further, the connecting wiring 420 may include the first wiring 420. The first wiring 420 may be made of the same material as the first electrode 412 of the touch electrode 410. Unlike one illustrated in FIG. 3, according to the exemplary embodiment, the connecting wiring 420 may include the second wiring positioned on the first wiring 420. In this case, the second wiring may be made of the same material as the second electrode 414 of the touch electrode 410.

Further, as illustrated in FIG. 4, the pad 430 may include a first conductive layer 432, a second conductive layer 434, and a first protective conductive layer 435 which are sequentially stacked.

The first conductive layer 432, the second conductive layer 434, and the first protective conductive layer 435 may have the same plane shape.

The second conductive layer 434 may be formed to have a width equal to or smaller than the first protective conductive layer 435 and a boundary line of the second conductive layer 434 may be positioned within the boundary line of the first protective conductive layer 435.

In other words, the first protective conductive layer 435 may cover the whole of the second conductive layer 434.

The first conductive layer 432 may be made of the same material as the first electrode 412 of the touch electrode 410. For example, the first conductive layer 432 may include the metal nano wire.

Further, the second conductive layer 434 may be made of the same material as the second electrode 414 of the touch electrode 410 and may be made of the conductive material including, for example, ITO, IZO, and the like.

Further, the first protective conductive layer 435 may be made of any one of copper (Cu), titanium (Ti), aluminum (Al), molybdenum (MO), and a transparent conducting oxide (TCO), which are low-resistance metals.

A passivation layer 480 that covers the touch electrodes 410, the connecting wiring 420, and the pad 430 is positioned on the substrate 401. The passivation layer 480 includes a contact hole 491 through which a portion of the pad 430 is exposed. The passivation layer 480 may be made of SiN$_X$.

Hereinafter, a manufacturing process of a touch sensor according to the exemplary embodiment will be described.

Figure 4A:
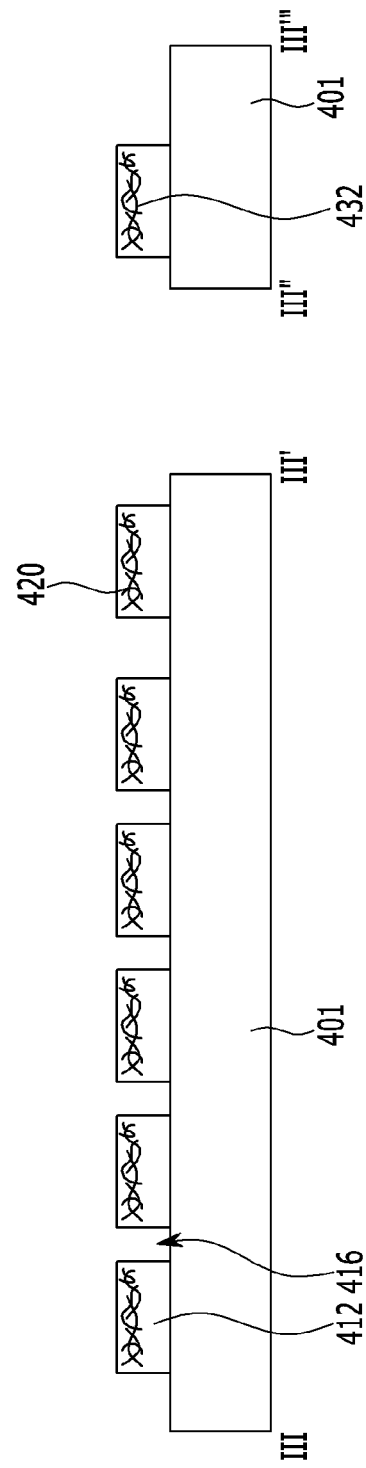
FIGS. 4A, 4B, and FIG. 4C are partial cross-sectional views of a manufacturing process of a touch sensor according to an exemplary embodiment.
Figure 4B:
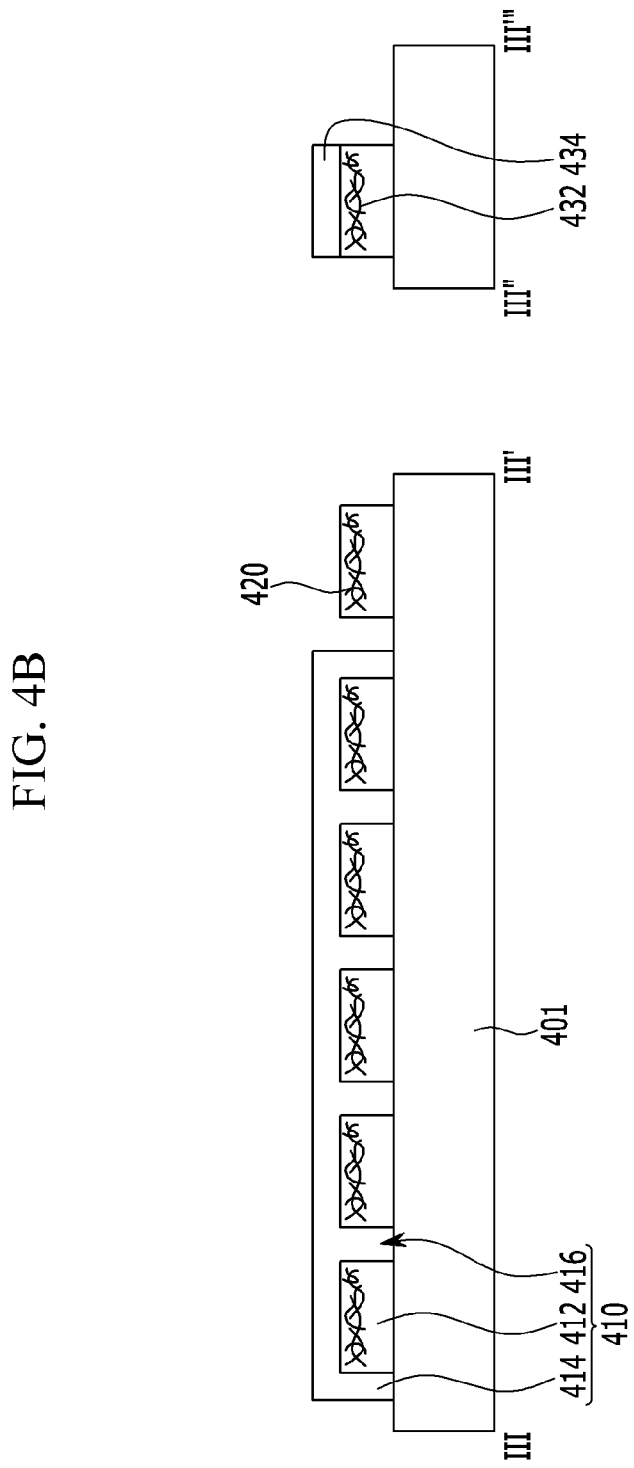
Figure 4C:
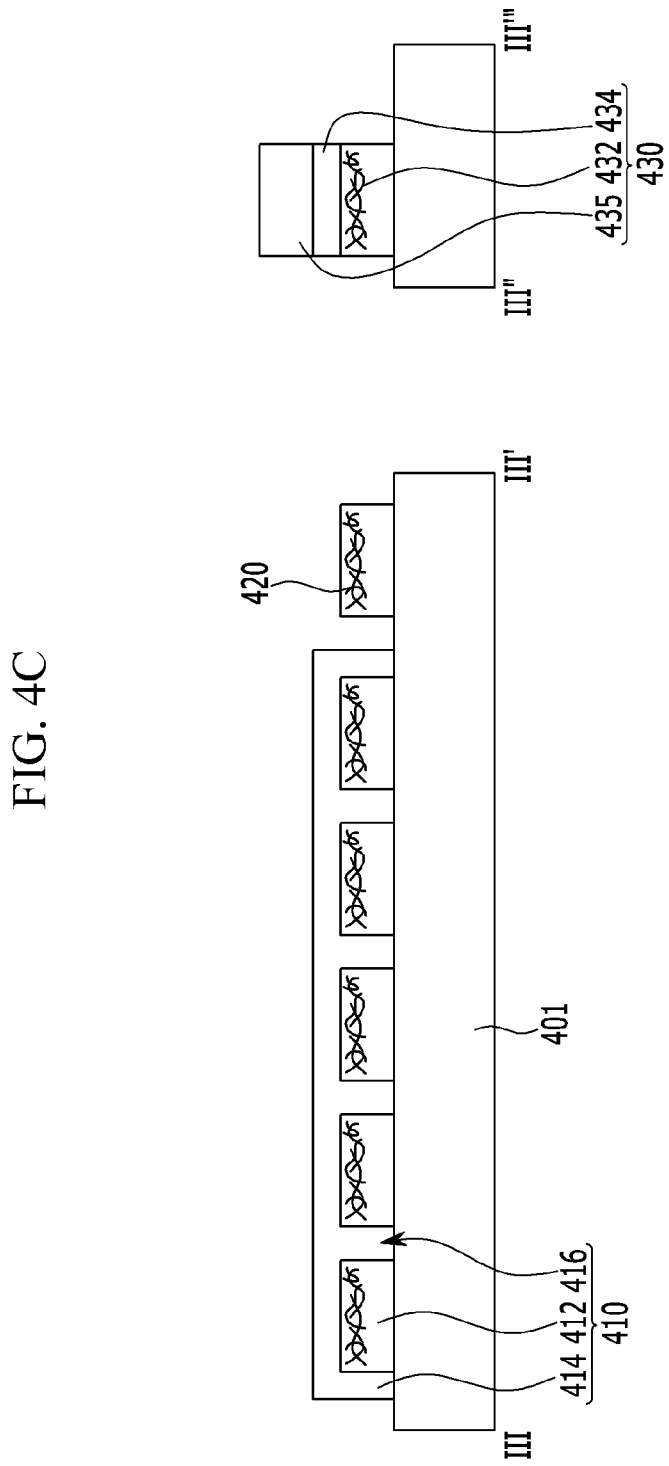

FIGS. 4A, 4B, and FIG. 4C are partial cross-sectional views of a manufacturing process of a touch sensor according to an exemplary embodiment of the present invention, which is a process cross-sectional view taken along the cross-sectional lines III-III' and III"-III'" of FIG. 2.

Referring to FIGS. 2 and 4A, the material including the silver nano wire and the polymer resin is applied on the substrate 401 and is patterned to form the first electrode 412, the first wiring 420, and the first conductive layer 432. The silver nano wire may be applied by the solution process together with the polymer resin.

In this case, the first electrode 412 includes openings 416 and the first electrode 412 other than the openings 416 may be patterned by a mask process.

Referring to FIGS. 2 and 4B, the second electrode 414 which covers the first electrode 412 and the openings 416 is formed is formed while the second conductive layer 434 is formed on the first conductive layer 432 in the same form.

The second electrode 414 and the second conductive layer 434 may be made of the conductive material, for example, indium tin oxide (ITO). The second electrode 414 is patterned to cover the whole of the openings 416 and the first electrode 412.

In this case, the thickness of the second electrode 414 and the second conductive layer 434 is formed to be equal to or less than 300 Å, thereby improving the pattern visibility.

Referring to FIGS. 2 and 4C, copper is deposited on the second conductive layer 434 to form the pattern of the first protective conductive layer 435.

Here, the example in which the first protective conductive layer 435 is made of copper is described, but the exemplary embodiment of the present invention is not limited thereto and therefore the first protective conductive layer 435 may also be made of any one of aluminum (Al), molybdenum (MO), titanium (Ti), and a transparent conducting oxide (TCO).

Further, the case in which the second electrode 414 and the second conductive layer 434 are patterned and then the first protective conductive layer 435 is patterned is described but according to the exemplary embodiment, the second electrode 414, the second conductive layer 434, and the first protective conductive layer 435 may be formed by one half tone mask process or a slit mask process.

Hereinafter, a touch sensor according to another exemplary embodiment will be described with reference to FIGS. 5 and 6A, 6B, and 6C.

Figure 5:
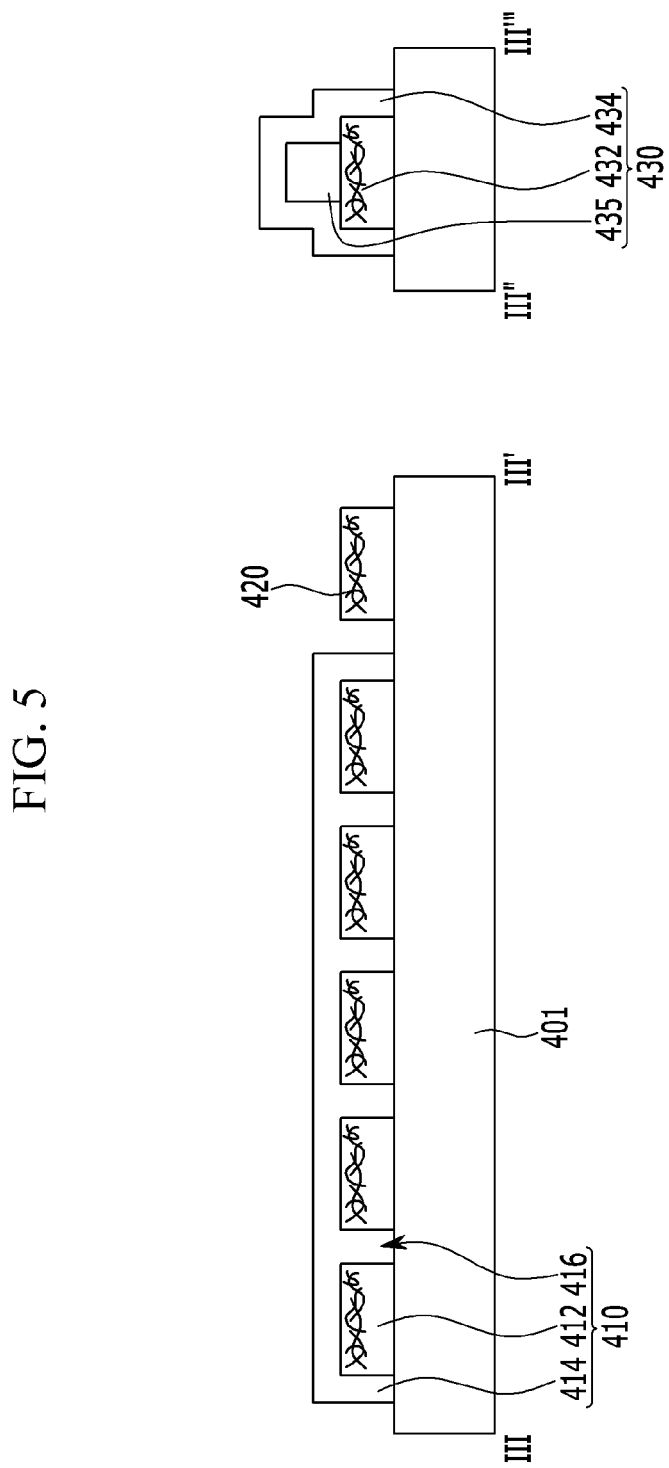
FIG. 5 is a cross-sectional view of a touch sensor according to another exemplary embodiment.
Figure 6A:
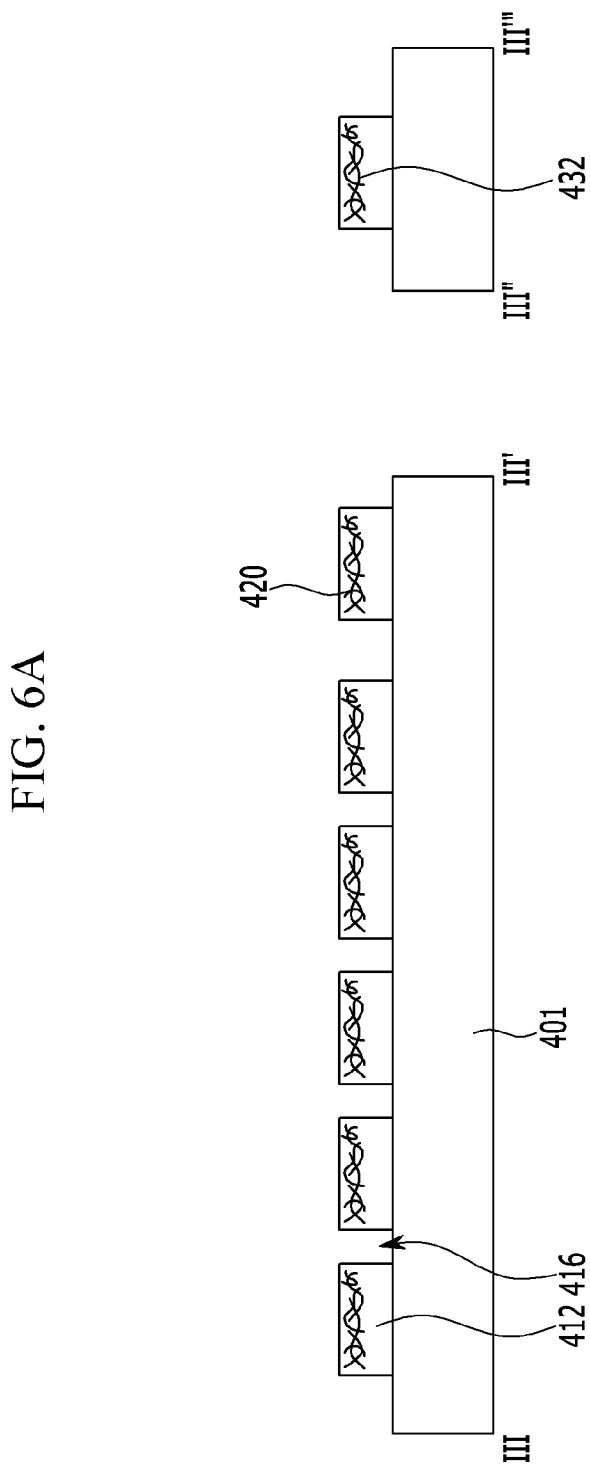

FIG. 5 is a cross-sectional view of a touch sensor according to another exemplary embodiment taken along the cross-sectional lines III-III' and III"-III'" of FIG. 2. FIGS. 6A, 6B, and FIG. 6C are partial cross-sectional views of a manufacturing process of a touch sensor according to another exemplary embodiment that is a process cross-sectional view taken along the cross-sectional lines III-III' and III"-III'" of FIG. 2. The overlapping description of a repeated portion in a material, a structure, and the like of each configuration will be omitted.

Referring to FIGS. 2, 5, and 6A, the material including the silver nano wire and the polymer resin is applied on the substrate 401 and is patterned to form the first electrode 412 including the 416, the first wiring 420, and the first conductive layer 432.

Next, referring to FIGS. 2, 5, and 6B, the first protective conductive layer 435 is patterned by depositing copper on the first conductive layer 432.

In this case, the patterns of the first electrode 412, the first wiring 420, and the first conductive layer 432 are formed and then the pattern of the first protective conductive layer 435 is formed. More specifically, the first electrode 412, the first wiring 420, the first conductive layer 432, and the first protective conductive layer 435 may be formed by one half tone mask process or the slit mask process.

Next, referring to FIGS. 2, 5, and 6C, the pattern of the second conductive layer 434 positioned on the first protective conductive layer 435 may be formed. The second conductive layer 434 may be made of any one of copper (Cu), titanium (Ti), aluminum (Al), molybdenum (MO), and transparent conductive oxide (TCO).

In this case, the second conductive layer 434 may cover the whole of the upper surface and the side of the first conductive layer 432 and the first protective conductive layer 435.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A touch screen panel, comprising:
   a substrate;
   touch electrodes positioned in a touch area of the substrate and configured to sense a touch;
   connecting wirings connected to the touch electrodes; and
   pads positioned in a peripheral area of the substrate and connected to the electrodes,
   wherein:
   the touch electrodes comprise a first electrode and a second electrode positioned on the first electrode;
   the first electrode comprises openings and the second electrode covers the first electrode and completely fills in the openings of the first electrode; and
   the first electrode comprises a metal nano wire and directly contacts the second electrode.

2. The touch screen panel of claim 1, wherein:
   the first electrode further comprises a polymer resin layer.

3. The touch screen panel of claim 1, wherein:
   the second electrode comprises a conductive material.

4. The touch screen panel of claim 1, wherein:
   a thickness of the second electrode is less than or equal to 300 Å.

5. The touch screen panel of claim 1, wherein:
   the pads comprise:
   a first conductive layer positioned on the substrate;
   a second conductive layer positioned on the first conductive layer; and
   a first protective conductive layer positioned on the second conductive layer.

6. The touch screen panel of claim 5, wherein:
   the first protective conductive layer is made of any one of copper (Cu), titanium (Ti), aluminum (Al), molybdenum (MO), and a transparent conducting oxide (TCO).

7. The touch screen panel of claim 1, wherein:
   the pads comprise:
   a first conductive layer positioned on the substrate;
   a first protective conductive layer positioned on the first conductive layer; and a second conductive layer positioned on the first protective conductive layer.

8. The touch screen panel of claim 7, wherein:
the second conductive layer is made of any one of copper (Cu), titanium (Ti), aluminum (Al), molybdenum (MO), and a transparent conducting oxide (TCO).

9. The touch screen panel of claim 7, wherein:
the second conductive layer covers an upper surface and a side of the first conductive layer and the first protective conductive layer.

10. The touch screen panel of claim 1, further comprising:
a passivation layer formed on the substrate,
wherein the passivation layer has an opening through which the pad is exposed.

11. The touch screen panel of claim 10, wherein:
the passivation layer is made of silicon nitride (SiNX).

12. The touch screen panel of claim 1, wherein:
the touch electrodes are disposed in a matrix and touch electrodes closer to the pads have a smaller size than touch electrodes further from the pads.

\* \* \* \* \*